United States Patent [19]

Cataldo

[11] Patent Number: 5,463,940
[45] Date of Patent: Nov. 7, 1995

[54] PROOFING OVEN

[75] Inventor: Michael D. Cataldo, Halifax, Mass.

[73] Assignee: Dunkin' Donuts Incorporated, Randolph, Mass.

[21] Appl. No.: 249,141

[22] Filed: May 25, 1994

[51] Int. Cl.⁶ .............................. A21B 1/00; A21B 1/22; F27D 11/00
[52] U.S. Cl. .................. 99/476; 99/470; 99/474; 126/214; 126/369
[58] Field of Search .................. 99/474, 473, 476, 99/475, 470; 126/21 A, 20, 20.1, 20.2, 369, 348; 219/401, 400

[56] References Cited

U.S. PATENT DOCUMENTS

| | | | |
|---|---|---|---|
| 3,552,300 | 1/1971 | Matzke et al. | 99/352 |
| 3,566,807 | 3/1971 | Blanchard et al. | 107/54 |
| 3,570,651 | 3/1971 | Lanham et al. | 198/136 |
| 3,630,755 | 12/1971 | Schiffmann et al. | 99/90 R |
| 3,680,493 | 8/1972 | Lanham et al. | 107/57 C |
| 3,754,464 | 8/1973 | Kaufman, Jr. et al. | 99/334 |
| 3,757,671 | 9/1973 | Warshauer et al. | 99/400 |
| 4,100,848 | 7/1978 | Grissinger | 99/353 |
| 4,346,803 | 8/1982 | Haessler et al. | 198/813 |
| 4,373,892 | 2/1983 | Nordmann | 425/207 |
| 4,515,819 | 5/1985 | Shinriki | 426/297 |
| 4,657,769 | 4/1987 | Petrofsky et al. | 426/549 |
| 4,674,402 | 6/1987 | Raufeisen | 99/468 |
| 4,729,470 | 3/1988 | Bacigalupe et al. | 198/838 |
| 4,743,452 | 5/1988 | Felske et al. | 426/19 |
| 4,836,360 | 6/1989 | Kasik | 198/803.6 |
| 4,861,601 | 8/1989 | Seneau | 426/19 |
| 4,882,981 | 11/1989 | Bacigalupe et al. | 99/479 |
| 4,891,498 | 1/1990 | Fortmann et al. | 126/20 |
| 4,939,987 | 7/1990 | Smith | 126/369 |
| 4,972,941 | 11/1990 | Kasik | 198/803.6 |
| 4,984,557 | 1/1991 | Konig | 126/20 |
| 4,986,992 | 1/1991 | Glaros et al. | 426/19 |
| 5,056,654 | 10/1991 | Kasik | 198/803.6 |
| 5,083,505 | 1/1992 | Kohlstrung et al. | 126/369 |
| 5,147,033 | 9/1992 | Kasik | 198/803.6 |
| 5,149,594 | 9/1992 | Lewandowski et al. | 426/503 |
| 5,171,590 | 12/1992 | Sluimer | 426/19 |
| 5,178,125 | 1/1993 | Kuen | 126/20 |

Primary Examiner—David Scherbel
Assistant Examiner—Reginald L. Alexander
Attorney, Agent, or Firm—Weingarten, Schurgin, Gagnebin & Hayes

[57] ABSTRACT

A proofing oven which uniformly proofs large quantities of raised-dough goods and eliminates the need for special expertise to produce uniformly-proofed baked goods is provided. The proofing oven includes a proofing chamber; a heat source for providing a desired controllable, stable and uniform proofing temperature in the proofing chamber; a humidifier for introducing a desired controlled humidity into the proofing chamber; a dehumidifier for removing moisture from the proofing chamber to maintain such controlled humidity; an air circulation system for circulating the controlled air of the proofing chamber throughout the chamber and providing a mild turbulent air flow uniformly over the goods being proofed in the chamber; and a control system for setting and automatically regulating the proofing environment of the proofing chamber, including the time of proofing and the temperature and humidity in the proofing chamber for the particular goods and/or proofing requirements.

37 Claims, 2 Drawing Sheets

PROOFING OVEN

FIELD OF THE INVENTION

This invention relates to proofing ovens and more particularly proofing ovens for bakery products.

BACKGROUND OF THE INVENTION

Proofing is a term used in the baking industry to describe the process of raising yeasted dough prior to baking. In the industry, it is useful to have a means for commercially proofing large quantities of yeasted-dough goods, such as breads, croissants, pastries and donuts. Such mass proofing means must provide a large, controlled environment at a temperature and relative humidity optimal for proofing. In such mass-proofing, it is important that the optimal proofing environment for the particular goods be stable for the entire proofing period. It is also important that the proofing environment be uniform throughout all areas of the proofing chamber, where the goods are spaced. If the optimal temperature and relative humidity levels are not obtained or maintained throughout the chamber during the entire proofing process, optimal proofing will not occur and will require time adjustment or movement of all or a portion of the product. Further, if the temperature and humidity conditions are not uniform throughout the proofing chamber, consistent proofing of all of the goods in the chamber will not occur.

The mass proofing of some yeasted-dough products is especially critical. For example, superior donut dough is made quite soft to enhance the shelf life of the baked product. Because the raw donut dough is particularly soft, it is especially sensitive to the proofing environment, and requires precise control of the temperature and relative humidity conditions throughout the proofing chamber. The softness of the raw donut dough adds a further problem. During proofing, all yeasted dough, because of its moistness, adds humidity to the proofing environment and can make the humidity level difficult to control in a sealed proofing chamber. Because of the extra softness of donut dough, it tends to further add to the humidity of the proofing environment, rendering control of the humidity level, which is especially important for donut dough, even more difficult.

The commercial mass proofing of raised-donut dough presents an additional consideration. To minimize fat absorption during baking, raised donut dough, when properly proofed, should have a smooth dry skin. This is the primary consideration in proofing donuts. Thus, for commercial donut production, it is important to provide a uniform proofing environment in a manner which will consistently produce raised donuts with such a texture, and in a manner that maintains such consistency from oven to oven, shop to shop, and region to region.

Proofing ovens have been developed in the commercial-baking industry in an attempt to provide a stable, controlled environment for the mass proofing of baked goods. In general, such commercial proofing ovens have included a large sealed chamber into which the raw goods are placed, typically in bakers' racks or shelves. Typically, such proofing ovens have included heat and humidity sources and temperature and humidity controls for attempting to provide the desired proofing environment for the particular goods. Such ovens have also usually included a fan or other means for providing air flow, which is typically laminar, across the raw goods within the chamber.

But these proofing ovens have not produced ideal results. Although control of the temperature and humidity of the proofing environment is possible in many of these ovens, precise control of the environment to the level needed for many baked goods, including raised donuts, has not been achieved. For example, many current commercial proofing ovens, such as the oven disclosed in U.S. Pat. No. 5,072,666 of Hullstrung, include means for increasing the humidity in the proofing chamber to the desired level and for monitoring such level. However, control of the humidity level in such ovens is limited to merely shutting off the humidity source when the desired humidity level is reached or exceeded. No means is provided to reduce the humidity level if the desired level is exceeded. Thus, rapid, precise control of the proofing environment is not possible. This is particularly true when large batches of soft yeasted dough, especially raised donut dough, are proofed in such ovens. The moisture from such dough can significantly increase the humidity in the sealed chamber, which can cause an over-humidity condition or make recovery from an over-humidity condition difficult or impossible.

Further, current commercial proofing ovens do not produce a uniform proofing environment throughout the proofing chamber. Many of the ovens use air blowers to circulate the heated and humidified air over the raw goods. Typically, air is drawn from the chamber at one side, passed through the heat and humidity sources, where the temperature and relative humidity of the air may be increased, and reintroduced to the chamber at the opposite side of the chamber. The flow of air across the rows of racked goods is typically laminar. This laminar flow does not produce even distribution of the temperature and humidity to all areas of the proofing chamber. For example, because hot air rises, the raised dough goods at the top of the chamber tend to be dryer, and the goods at the bottom tend to be wetter. Further, as the moist, hot air flows across the rows of racked goods, the goods nearest to the air entry tend to receive the most benefit of the moist, warm air. Because of the laminar flow, lesser proofing occurs as the air proceeds across the rows of goods, resulting in inconsistent product.

Accordingly, if consistent raised-dough goods are desired, the mass proofing of commercial baked goods in current proofing ovens is a labor and time intensive operation, requiring the skills of an experienced baker. To achieve consistent goods in the current ovens, experienced bakers must carefully monitor the proofing process. If the humidity level exceeds the desired level for the product, the baker must turn off the humidifier and/or open the oven door to rapidly reduce the humidity. The degree to which the baker opens the door and the length of time the door is opened depend upon the situation, and are determined by the baker, based upon his experience.

To achieve consistent proofing of all of the goods (particularly donuts) in the proofing oven, the baker must also periodically rearrange the goods in the oven, so that all of the goods are exposed to the same proofing environment. The number, times and patterns of rearrangements all depend upon the situation, and are also determined by the baker, based upon his or her experience. Thus, proofing with current proofing ovens is an expensive and time-consuming operation, requiring considerable training and experience with the goods being proofed.

SUMMARY OF THE INVENTION

The present invention is a proofing oven which overcomes the shortcomings of the prior art. The proofing oven of the present invention uniformly proofs large quantities of yeasted dough goods and eliminates the expertise presently needed to produce uniformly-proofed dough from the prior art ovens. The oven of the present invention includes a proofing chamber; a heat source for providing a desired controllable, stable and uniform proofing temperature for chamber air; a humidifier for introducing a desired controlled humidity into chamber air; a dehumidifier for removing moisture from chamber air to maintain such controlled humidity; an air circulation system for circulating chamber air throughout the chamber and providing a mild turbulent air flow uniformly over the dough; and a control system for setting and automatically regulating the proofing environment of the proofing chamber, including the time of proofing and the temperature and humidity of the proofing chamber for the particular goods and/or proofing requirements.

The controller can also include settings for proofing fresh dough, in which case the controller would immediately initiate a proofing cycle; or frozen dough, in which case the controller would first initiate a thawing cycle, and then upon completion of the thaw cycle, initiate a proofing cycle.

Thus, the present invention provides a proofing oven which automatically, precisely and consistently proofs large commercial batches of raised-dough bakery goods, including donuts, without a need for special expertise, or labor and time intensive manual control of the proofing process.

BRIEF DESCRIPTION OF THE DRAWINGS

The present invention will be more fully understood by reference to the following detailed description considered in conjunction with the accompanying drawings, in which.

DETAILED DESCRIPTION OF THE INVENTION

Figure 1:
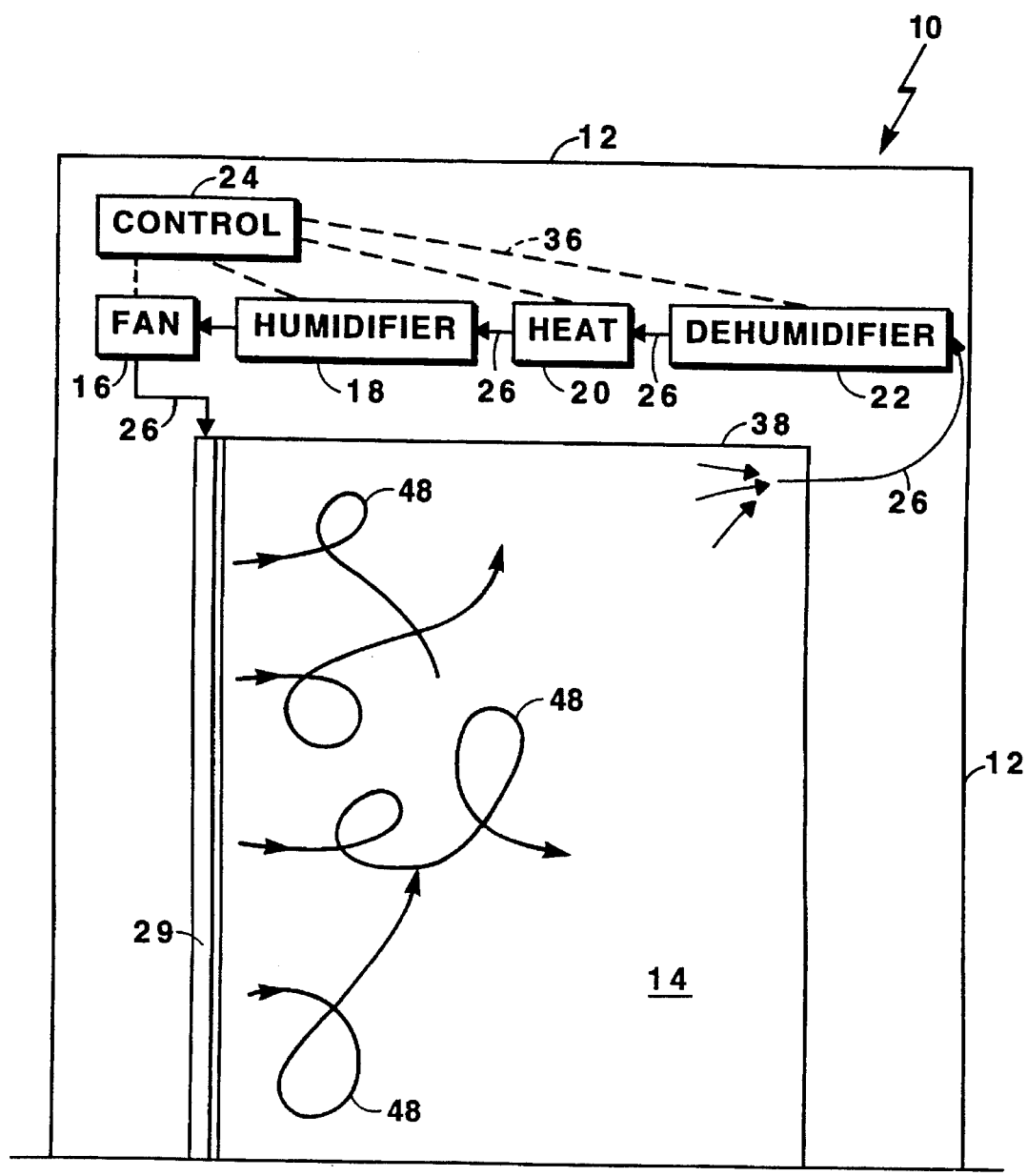
FIG. 1 is a diagrammatic front view of the proofing oven of the present invention.
Figure 2:
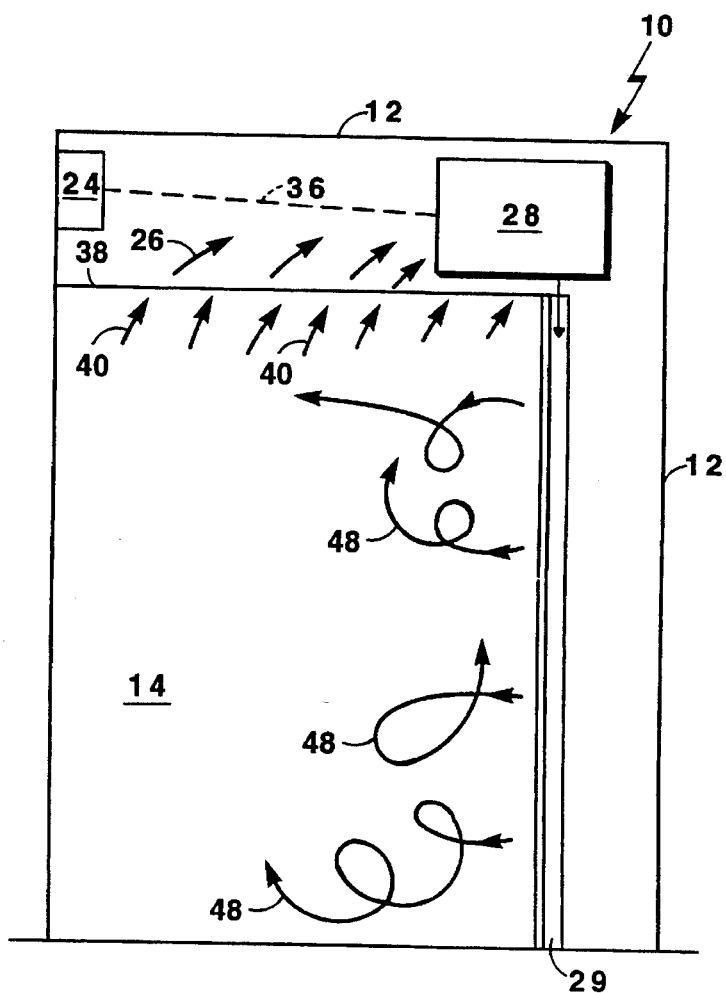
FIG. 2 is a diagrammatic side view of the proofing oven of the present invention.
Figure 4:
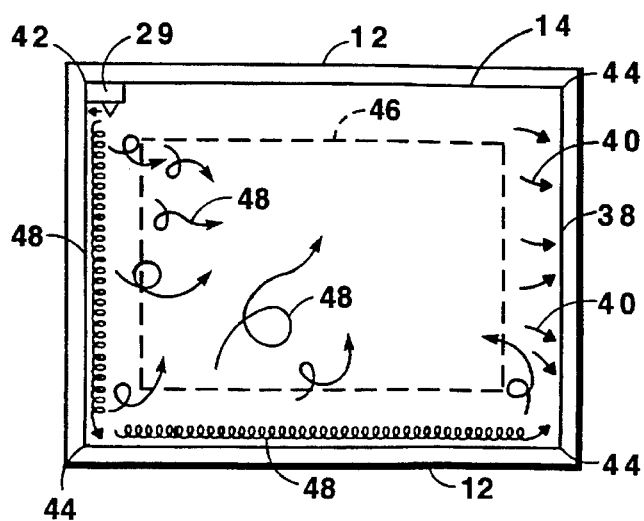
FIG. 4 is a diagrammatic top view further showing the air flow in the proofing chamber of the present invention.

Referring to the drawings wherein like reference numerals designate corresponding or similar elements throughout the several views, a proofing oven 10 according to the present invention which overcomes the problems of the prior art is shown in FIGS. 1 and 2. The proofing oven 10 includes an oven housing 12 containing a proofing chamber 14, fan or air blower 16, humidifier 18, heat source 20, dehumidifier 22 and controller 24. In housing 12, proofing oven 10 also includes air passages generally depicted by arrows 26 which direct air from proofing chamber 14 through the dehumidifier 22, heat source 20, humidifier 18 and fan 16. In FIG. 2, the fan or air blower 16, humidifier 18, heat source 20 and dehumidifier 22 are collectively designated unit 28. Proofing oven 10 also includes a door (not shown) mounted on oven housing 12 which seals proofing chamber 14.

In the embodiment shown, fan or air blower 16 draws air from the proofing chamber 14 through the dehumidifier 22, heat source 20 and humidifier 18 and returns such air to the proofing chamber through baffles or deflectors 29 to circulate the air in a turbulent manner in the proofing chamber and to allow control of the temperature and relative humidity of such air to maintain an optimal proofing environment in chamber 14.

The temperature and relative humidity of the proofing environment of chamber 14 is monitored and controlled by controller 24. As can best be seen in FIG. 3, controller 24 includes a touch pad 30 with display 32, or other means, for selecting the desired proofing environment for the particular goods being proofed. For example, a particular relative humidity level, temperature and time may be entered into controller 24. Controller 14 also includes sensors or monitors 34, which are placed in the proofing chamber 14 or the air stream designated by arrows 26 to sample the temperature and relative humidity level of the proofing environment. Through conductors or other means generally depicted by dotted lines 36 in FIGS. 1 and 2, the information provided by the sensors 34, is used by controller 24 to regulate dehumidifier 22, heat source 20, and humidifier 18 with fan 16 to control the desired temperature and relative humidity. The turbulent air flow of the proofing environment in chamber 14 remains constant.

Controller 24 can also be programmable and/or include means for selecting multiple sequential proofing cycles, wherein the temperature, relative humidity or other conditions of the proofing environment would change as desired over time, or, as will be discussed in more detail below, to provide a thaw cycle prior to a proofing cycle for frozen raised-dough goods.

Figure 3:
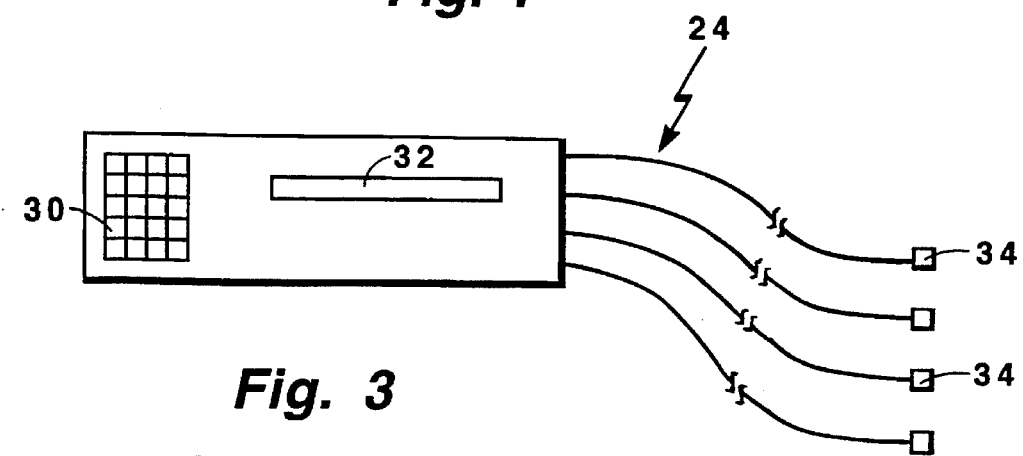
FIG. 3 is a diagrammatic representation of the controller employed in the present invention.

The proofing oven of the present invention commercially mass-proofs large amounts of yeasted-dough baked goods, particularly donuts. The goods are placed on conventional bakers racks, and wheeled into proofing chamber 14. The door of the proofing chamber is then sealed. After the characteristics of the proofing cycle, such as temperature, relative humidity and time are selected on controller 24, the proofing cycle is initiated. The fan or air blower 16 then begins to circulate air into chamber 14. In the disclosed embodiment, the air is drawn through the top right corner 38 of chamber 14, as indicated by arrows 40. The air then passes through dehumidifier 22, heat source 20 and humidifier 18. Under the control of controller 24, such units, designated 28 in FIG. 2, adjust the temperature and relative humidity levels of the air to meet the requirements of the particular proofing cycle. After passing through fan 16, the air is then returned to proofing chamber 14 through baffles or deflectors 29, which in the disclosed embodiment, are located along the rear left corner 42 of the chamber. As can be seen in FIG. 3, in addition to FIGS. 1 and 2, baffles or deflectors 29 impart upon such air a gentle turbulent flow, in part by deflecting the air off the corners 42 and 44 of the chamber. Further turbulent flow is imparted to the air as it is reflected off the various corners and surfaces of the bakers rack, which is generally depicted by dotted line 46 in FIG. 3. The gentle turbulent flow of the air in chamber 14, which is generally depicted by arrows 48, equalizes the proofing environment in chamber 14 and ensures that all goods within the chamber are equally exposed to a uniform proofing environment at the desired temperature and relative humidity levels for the particular cycle. The constant circulation of the air through the dehumidifier 22, heat source 20 and humidifier 18 ensures that the proofing environment of chamber 14 is precisely maintained at the desired temperature and humidity levels for the particular cycle.

To further illustrate the present invention, an exemplary proofing cycle for raised doughnuts cut from fresh dough will be described. After the doughnuts are cut from raw dough, they are placed in a conventional manner on the screens or shelves of a conventional bakers rack. The rack is then wheeled into proofing oven 10 and the door is sealed. The proofing requirements are then entered into the controller 24. Typical proofing requirements might include a temperature of 105° F. and a relative humidity of 40 to 45% for approximately 45 minutes. Upon initiation of the proofing cycle, fan or blower 16 begins circulating the air from the proofing chamber 14 and the controller instructs the humidifier 18, heat source 20 and dehumidifier 22 to adjust the relative humidity and temperature of the air to meet the desired requirements. If the proofing environment were to deviate from the desired requirements, controller 24 would instruct humidifier 18, heat source 20 and/or dehumidifier 22 to make the appropriate adjustments. For example, should the relative humidity level of the proofing environment exceed the desired level, which can occur when very soft, moist yeasted dough, such as doughnut dough, is proofed, controller 24 would instruct dehumidifier 22 to dehumidify the air of chamber 14 as it is circulated. Because the proofing oven 10 of the present invention includes a dehumidifier 22, the present invention can rapidly adjust the humidity level of the air so that the proofing environment of chamber 14 can be precisely controlled.

The proofing oven of the present invention can also be used to proof frozen dough. For example, the present invention can include a thawing cycle immediately prior to a proofing cycle. Such a feature of the present invention will now be discussed. After doughnuts are cut from fresh dough and then frozen, the frozen doughnuts are loaded onto conventional bakers racks and wheeled into chamber 14. The requirements of the thawing and proofing cycles are then entered into controller 24. A typical thawing cycle might include a temperature of 85° F. at a relative humidity of 35 to 40% for 60 minutes. A typical subsequent proofing cycle might be 105° F. at 40 to 45% relative humidity for 45 minutes. Upon initiation of the process, the controller begins air circulation and instructs the humidifier 18, heat source 20 and dehumidifier 22 to establish and maintain the thaw cycle of 85° F. at 35 to 40% relative humidity for 60 minutes. With sensors 34, the controller 24 monitors the environment in proofing chamber 14 to maintain such conditions for the duration of the thawing cycle. At the conclusion of the thawing cycle, the dough is completely thawed and typically has a temperature of 60 to 70° F., essentially room temperature. Immediately following the thawing cycle, the proofing oven 10 automatically proceeds to the proofing cycle. The controller 24 then automatically instructs the humidifier 18, heat source 20 and dehumidifier 22 to establish and maintain a proofing environment of 105° F. at 40 to 45% relative humidity for 45 minutes. After completion of the proofing cycle, the result is uniformly proofed goods processed without the intervention of an operator or baker during the thawing and/or proofing periods.

Although conventional bakers racks, which typically contain 20 shelves for baked goods, are suitable for use in the present invention, an increase in the spacing between the shelves from 2 ¾ to 3 ¾ inches, by reducing the number of shelves to 15–17, would further improve turbulent air flow around the raised-dough goods and further improve the quality of raised-dough goods proofed in the present invention.

The above description merely illustrates the presently preferred embodiment of the invention. Alternative embodiments are possible. Accordingly, the scope of the invention should be determined by the appended claims and their legal equivalents, not by the embodiments described above.

I claim:

1. A proofing oven, comprising:

a proofing chamber into which goods for proofing can be placed, said proofing chamber including an air inlet and an air outlet;

an air circulation system connected to said air inlet and said air outlet, which creates a gentle, uniform, turbulent air flow in said proofing chamber, and which establishes and maintains a desired proofing environment, said air circulation system comprising:

an air passage connecting said air inlet with said air outlet;

a heat source connected to said air passage, and which establishes and maintains a desired temperature of said air flow;

a humidifier connected to said air passage, and which establishes and maintains a desired relative humidity of said air flow;

a dehumidifier connected to said air passage, and which decreases the relative humidity of said air flow when the desired relative humidity level is exceeded; and at least one fan connected to said air passage, and which moves air between said air inlet and said air outlet to create said gentle, uniform, turbulent air flow in said proofing chamber.

2. The proofing oven of claim 1, further comprising a precise, automatic and consistent controller connected to said heat source, humidifier, dehumidifier, and fan which sets and automatically regulates said proofing environment.

3. The proofing oven of claim 2, wherein said controller further includes at least one sensor disposed in said air flow to sample said proofing environment.

4. The proofing oven of claim 2, wherein said controller includes a user interactive device for selecting the desired proofing environment.

5. The proofing oven of claim 4, wherein said user interactive device includes a touch pad with display.

6. The proofing oven of claim 2, wherein said controller is programmable.

7. A proofing oven, comprising:

a proofing chamber into which goods for proofing can be placed;

an air circulation system associated with said proofing chamber and which creates an air flow in the oven to establish and maintain a desired proofing environment in said chamber;

a heat source disposed in said air flow to establish and maintain a desired temperature of the proofing environment;

a humidifier disposed in said airflow to establish and maintain a desired relative humidity of the proofing environment;

a dehumidifier disposed in said air flow to decrease the relative humidity of the proofing environment when the desired relative humidity level is exceeded; and a programmable controller connected to said heat source, humidifier and dehumidifier for automatically regulating said proofing environment, wherein said programmable controller can be set for multiple, sequential proofing cycles.

8. The proofing oven of claim 7, wherein said air flow is turbulent.

9. The proofing oven of claim 7, wherein said air circulation system includes at least one air passage which directs air from said proofing chamber through said dehumidifier, heat source and humidifier, and further includes a fan disposed in said air passage.

10. The proofing oven of claim 9, wherein said air circulation system further includes an outlet disposed in said proofing chamber which draws air from said chamber into said passage, and an air inlet in said proofing chamber which returns air to said proofing chamber from said passage.

11. The proofing oven of claim 10, wherein said air outlet includes a baffle which creates a gentle turbulent air flow in said proofing chamber.

12. The proofing oven of claim 7, wherein said controller further includes at least one sensor disposed in said air flow to sample said proofing environment.

13. The proofing oven of claim 7, wherein said controller includes a user interactive device for selecting the desired proofing environment.

14. The proofing oven of claim 13, wherein said user interactive device includes a touch pad and display.

15. The proofing oven of claim 7, wherein said multiple sequential proofing cycles include a thawing cycle and a proofing cycle.

16. The proofing oven of claim 10, wherein said air outlet draws air from said chamber at a top corner of said chamber, and wherein said air inlet returns air to said chamber along an opposite corner of said chamber.

17. The proofing oven of claim 2, wherein said controller sets and regulates said proofing environment for a predetermined time period.

18. The proofing oven of claim 2, wherein said controller is operable to set and regulate said proofing environment for at least one timed cycle.

19. The proofing oven of claim 18, wherein said programmable controller can be set for multiple sequential timed cycles.

20. The proofing oven of claim 19, wherein said multiple sequential timed cycles include a thawing cycle and a proofing cycle.

21. The proofing oven of claim 1, wherein said air circulation system is a closed system.

22. The proofing oven of claim 1, wherein said air outlet draws air from said chamber at a top corner of said chamber, and wherein said air inlet returns air to said chamber at an opposite corner of said chamber.

23. The proofing oven of claim 22, wherein said air circulation system causes said air flow in said chamber to move from said opposite corner toward said top corner.

24. The proofing oven of claim 22, wherein said air inlet includes a baffle.

25. The proofing oven of claim 22, wherein said air inlet directs air toward said opposite corner.

26. The proofing oven of claim 22, wherein said air inlet directs air substantially along the full length of said opposite corner.

27. A proofing oven, comprising:

a proofing chamber into which goods for proofing can be placed;

an air circulation system associated with said proofing chamber and which creates an air flow in the oven to establish and maintain a desired proofing environment in said chamber;

a heat source disposed in such air flow to establish and maintain a desired temperature of the proofing environment;

a humidifier disposed in such air flow to establish and maintain a desired relative humidity of the proofing environment;

a dehumidifier disposed in such air flow to decrease the relative humidity of the proofing environment when the desired relative humidity level is exceeded; and a programmable controller connected to said heat source, humidifier and dehumidifier for automatically regulating said proofing environment, wherein said programmable controller can be set for sequential cycles.

28. The proofing oven of claim 27, wherein said air flow is turbulent.

29. The proofing oven of claim 27, wherein said air circulation system includes at least one air passage which directs air from said proofing chamber through said dehumidifier, heat source and humidifier, and further includes at least one fan disposed in said air passage.

30. The proofing oven of claim 29, wherein said air circulation system further includes an outlet disposed in said proofing chamber which draws air from said chamber into said passage, and an air inlet in said proofing chamber which returns air to said proofing chamber from said passage.

31. The proofing oven of claim 30, wherein said air outlet includes a baffle which helps create a gentle turbulent air flow in said proofing chamber.

32. The proofing oven of claim 30, wherein said air outlet draws air from said chamber at a top corner of said chamber, and wherein said air inlet returns air to said chamber at an opposite corner of said chamber.

33. The proofing oven of claim 27, wherein said controller further includes at least one sensor disposed in said air flow to sample said proofing environment.

34. The proofing oven of claim 27, wherein said controller includes a user interactive device for selecting the desired proofing environment.

35. The proofing oven of claim 34, wherein said user interactive device includes a touch pad and display.

36. The proofing oven of claim 27, wherein said sequential cycles include at least two proofing cycles.

37. The proofing oven of claim 27, wherein said sequential cycles include a thawing cycle and a proofing cycle.

* * * * *